(12) United States Patent
Tilsner et al.

(10) Patent No.: US 6,619,663 B2
(45) Date of Patent: Sep. 16, 2003

(54) BODY STRUCTURE FOR A MOTOR VEHICLE HAVING FORWARD SPRING STRUT RECEIVING DEVICES AND METHOD OF MAKING SAME

(75) Inventors: Michael Tilsner, Wiernsheim (DE); Rainer Stahl, Markgroeningen (DE); Matthias Herntier, Wurmberg (DE)

(73) Assignee: Dr. Ing. h.c.F Porsche AG, Weissach (DE)

( * ) Notice: Subject to any disclaimer, the term of this patent is extended or adjusted under 35 U.S.C. 154(b) by 0 days.

(21) Appl. No.: 09/852,671

(22) Filed: May 11, 2001

(65) Prior Publication Data

US 2002/0008407 A1 Jan. 24, 2002

(30) Foreign Application Priority Data

May 11, 2000 (DE) .......................... 100 23 194

(51) Int. Cl.⁷ .............................................. B60R 27/00
(52) U.S. Cl. ................... 276/194; 276/198; 276/203.02
(58) Field of Search ................... 296/188, 189, 296/194, 198, 203.01, 203.02, 203.04, 204

(56) References Cited

U.S. PATENT DOCUMENTS

| | | | |
|---|---|---|---|
| 4,290,626 A | * 9/1981 | Sullivan, Jr. et al. | 280/124.155 |
| 4,408,794 A | * 10/1983 | Harasaki | 296/198 |
| 4,497,523 A | * 2/1985 | Lederman | 280/668 |
| 4,669,777 A | * 6/1987 | Harasaki et al. | 296/194 |
| 5,024,482 A | * 6/1991 | Harasaki et al. | 296/194 |
| 5,344,187 A | * 9/1994 | Kreis et al. | 296/194 |
| 5,454,585 A | * 10/1995 | Dronen et al. | 280/660 |
| 5,498,018 A | * 3/1996 | Wahl et al. | 280/673 |
| 5,947,459 A | * 9/1999 | Ducloux et al. | 280/124.147 |
| 6,398,202 B1 | * 6/2002 | Schaible | 280/124.147 |

FOREIGN PATENT DOCUMENTS

| | | | |
|---|---|---|---|
| DE | 4004920 A1 | 9/1993 | |
| DE | 19709349 A1 | 7/1997 | |
| DE | 19630647 | 2/1998 | |
| JP | 58-63577 | * 4/1983 | 296/188 |
| JP | 63-2776 | * 1/1988 | 296/194 |
| JP | 64-36583 | * 2/1989 | 296/188 |
| JP | 1-275278 | * 11/1989 | 296/188 |
| JP | 2-189287 | * 7/1990 | 296/198 |
| JP | 3-32986 | * 2/1991 | 296/203.02 |
| JP | 3-112789 | * 5/1991 | 296/203.02 |
| JP | 3-204380 | * 9/1991 | 296/203.02 |
| JP | 4-2579 | * 1/1992 | 296/194 |
| JP | 4-189683 | * 7/1992 | 296/194 |
| JP | 4-215573 | * 8/1992 | 296/198 |
| JP | 6-144291 | * 5/1994 | 296/194 |

* cited by examiner

*Primary Examiner*—Joseph D. Pape
*Assistant Examiner*—H. Gutman
(74) *Attorney, Agent, or Firm*—Crowell & Moring LLP (57) ABSTRACT

For reinforcing a spring receiving device, body structure of a forward vehicle part has a reinforcing console between an upper hood support and a lower side member of the vehicle platform. The reinforcing console is arranged in a transverse direction of the vehicle and reinforce an edge area of a body metal sheet of the wheel house in a closing manner.

10 Claims, 9 Drawing Sheets

Fig. 11

BODY STRUCTURE FOR A MOTOR VEHICLE HAVING FORWARD SPRING STRUT RECEIVING DEVICES AND METHOD OF MAKING SAME

BACKGROUND AND SUMMARY OF THE INVENTION

This application claims the priority of German Patent Document 100 23 194.2, filed in Germany, May 11, 2000.

The invention relates to a vehicle body structure for a motor vehicle having forward spring strut receiving devices in a dome-shaped sheet metal body part of a wheel house which forms an upper spring support.

German Patent Document DE 43 04 920 A1 discloses a forward vehicle part for a motor vehicle which, in the area of a spring strut support, has supporting struts between a side member and a wheel house reinforcement. The supporting struts are used for reinforcing the side member against crash-caused forces. Furthermore, from German Patent Document DE 197 09 349 A1, a support structure for a forward vehicle part of a motor vehicle is known which provides a wheel house support between a side member and a wheel house. The wheel house support supports the side member against bending.

It is an object of the invention to provide a forward body structure of a motor vehicle with a reinforced spring strut receiving device which is easy to manufacture and connect with a wheel house.

According to preferred embodiments of the invention, this object is achieved by providing a body structure for a motor vehicle having a forward spring strut receiving device in a dome-shaped sheet metal body part of a wheel house, which forms an upper spring strut support, wherein on an open forward edge of the sheet metal body part of the spring strut receiving device—viewed in a driving direction—between a lower side member support of a vehicle platform and a hood support vertically offset thereto, a reinforcing console is arranged which extends approximately vertically and in a transverse direction of the vehicle between the side member support and hood support and, together with the sheet metal body part, forms a closed hollow support profile of a polygonal cross-section.

Important advantages achieved by the invention are that, in the area of the wheel house, a sheet metal body part for supporting a spring strut is formed by a reinforcing console, and, together with the sheet metal body part, the latter advantageously forms a hollow member and thus a stability composite. So that a corresponding stiffness can be achieved by means of the reinforcing console, it extends in the transverse direction of the vehicle from an upper hood support to a lower side member of the vehicle platform. As a result of the construction, these supports are arranged to be mutually offset in the transverse direction of the vehicle, so that a relatively large support base is obtained by the connection with the set-back sheet metal body part of the wheel house.

The reinforcing console may have a U-profile-shaped or angular construction and has a web which extends in the longitudinal direction of the vehicle; that is, the web surface is arranged approximately parallel to the longitudinal center axis of the vehicle. Either two bent legs or only one bent leg are/is provided on the web.

The reinforcing console is preferably shaped-out in an approximately triangular manner and, in an installed position, extends transversely to the vehicle, a first, approximately vertical edge section of the leg aligned transversely to the vehicle being connected with a corresponding attached sheet metal part, and a second edge section of the leg, which adjoins at an angle, being connected to a supporting surface of the spring strut of the sheet metal body part. The web of the reinforcing console bent to the leg is connected with a supporting surface of the sheet metal body part on a bent edge while forming a hollow space. For fastening the reinforcing console by means of spot welding, the free edges of the leg and of the web of the reinforcing console are connected for fastening purposes while resting on the bent edge of the sheet metal body part and on the surface of the sheet metal body part.

As a result of the construction of the sheet metal body part with the front wall of the vehicle as well as with the hood support and the side member of the platform, on the one hand, and the reinforcing console, on the other hand, a stable support of the spring strut is obtained, particularly since the spring strut receiving device is arranged between the reinforcing console and the stable front wall or the A-column of the vehicle.

Other objects, advantages and novel features of the present invention will become apparent from the following detailed description of the invention when considered in conjunction with the accompanying drawings.

BRIEF DESCRIPTION OF THE DRAWINGS

FIG. 6 is a sectional view, rotated 90° counter-clockwise, according to Line VI—VI of. FIG. 3;

DETAILED DESCRIPTION OF THE DRAWINGS

Figure 10:
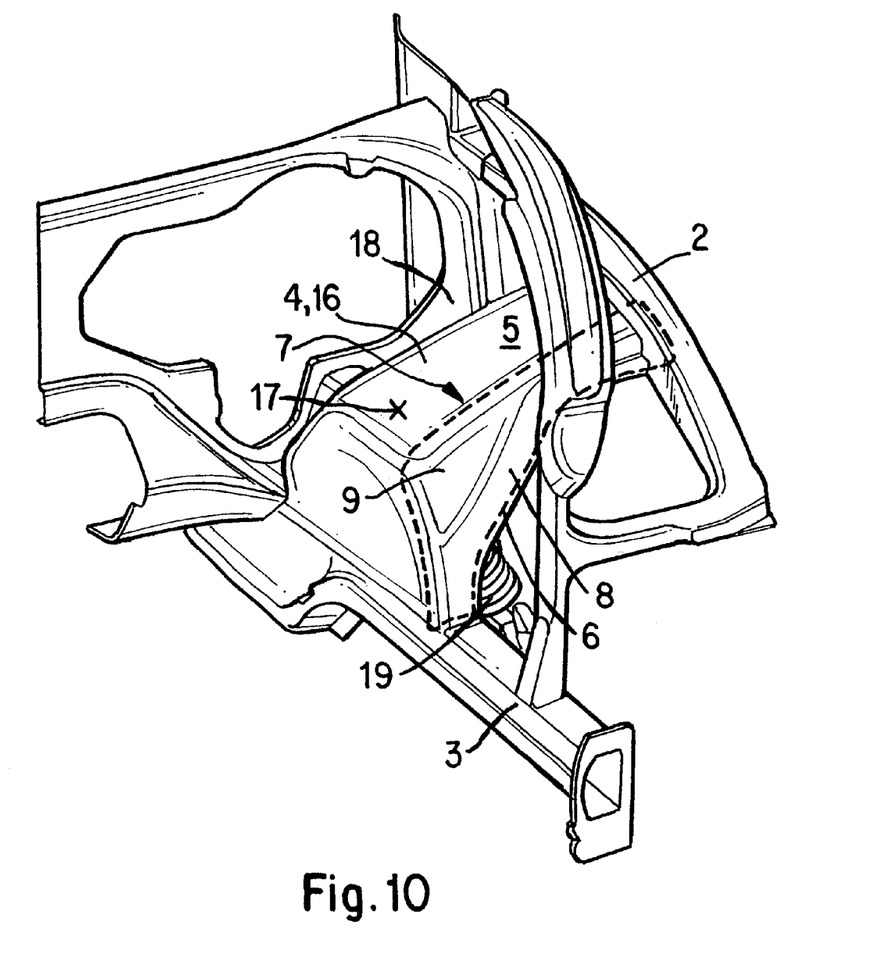
FIG. 10 illustrates a forward body portion of a motor vehicle with a spring strut.

FIG. 10 illustrates a forward body portion of a motor vehicle with a spring strut 19 and a reinforced spring strut receiving device which is easy to manufacture and connect with a wheel house 16. In the area of the wheel house 16, a sheet metal body part 4 for supporting the spring strut 19 is formed by a reinforcing console 7, and, together with the sheet metal body part, the latter advantageously forms a hollow member and thus a stability composite. So that a corresponding stiffness can be achieved by means of the reinforcing console 7, it extends in the transverse direction of the vehicle from an upper hood support 2 to a lower side member 3 of the vehicle platform.

Figure 1:
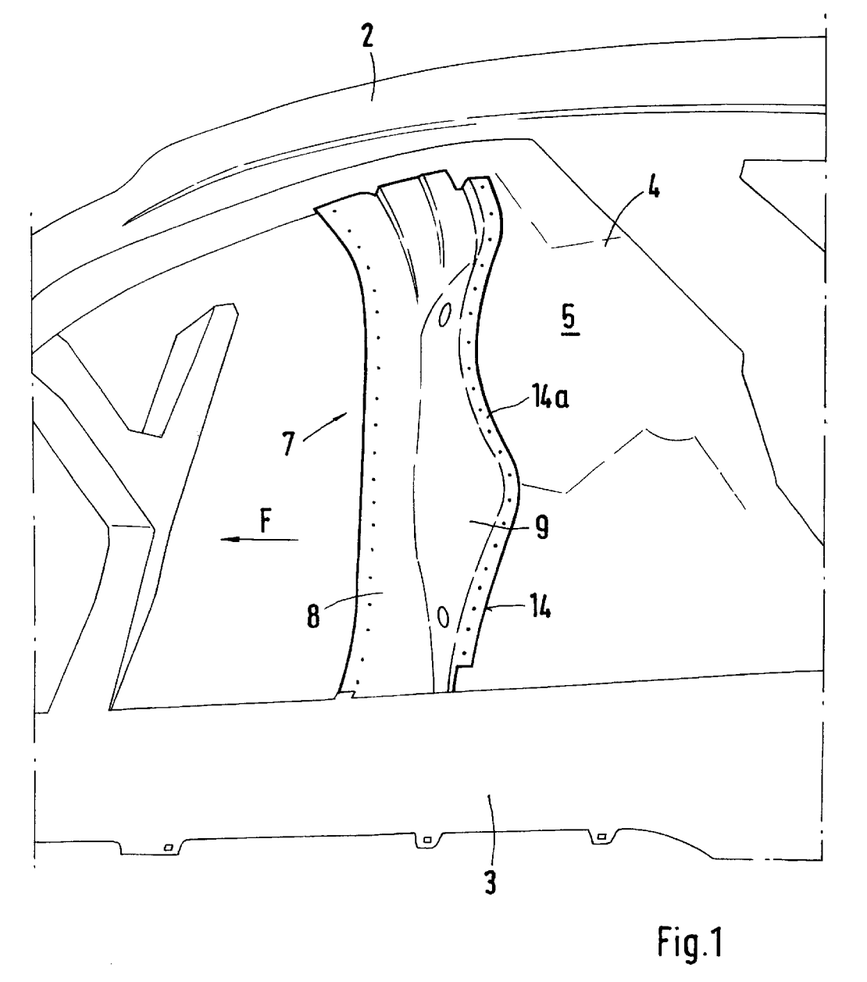
FIG. 1 is a diagrammatic representation of an installed reinforcing console between a hood support and a side member of a vehicle platform on the left vehicle side, viewed in the driving direction, showing a preferred embodiment of the invention.
Figure 2:
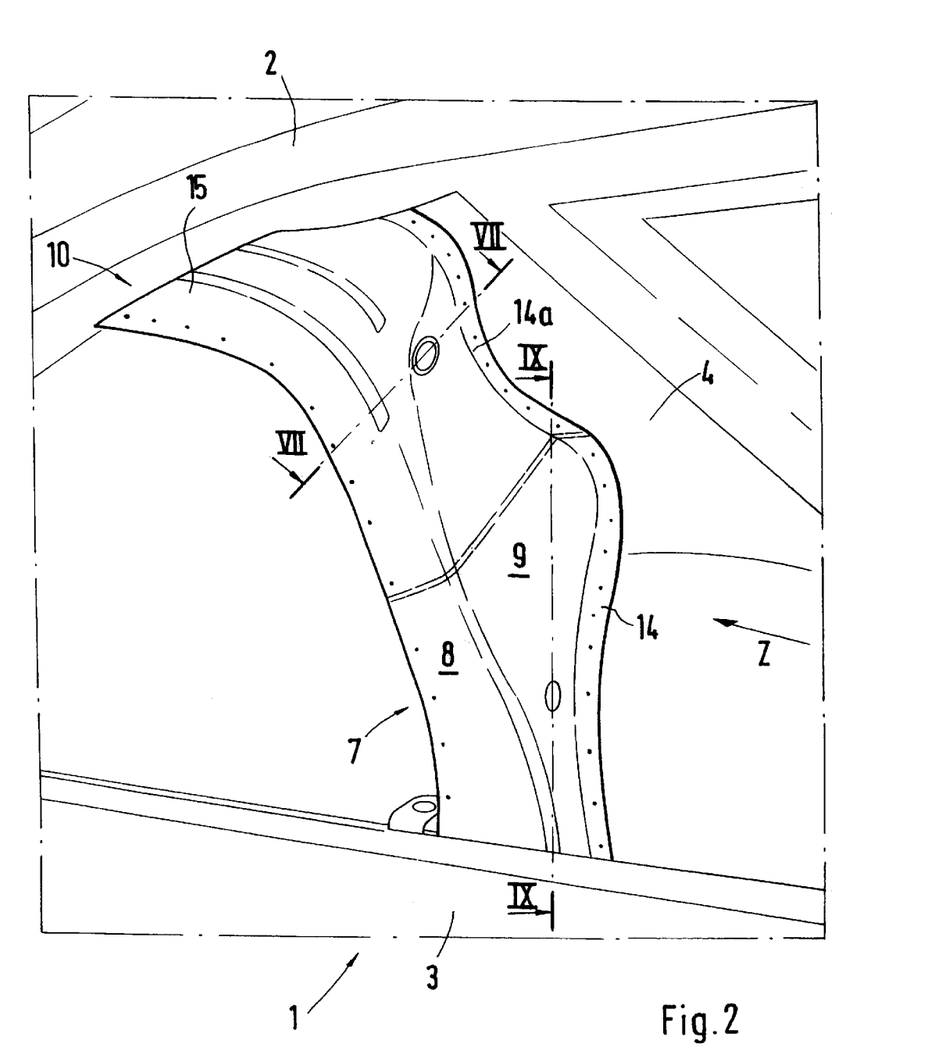
FIG. 2 is a diagonal view of the reinforcing console according to FIG. 1.
Figure 3:
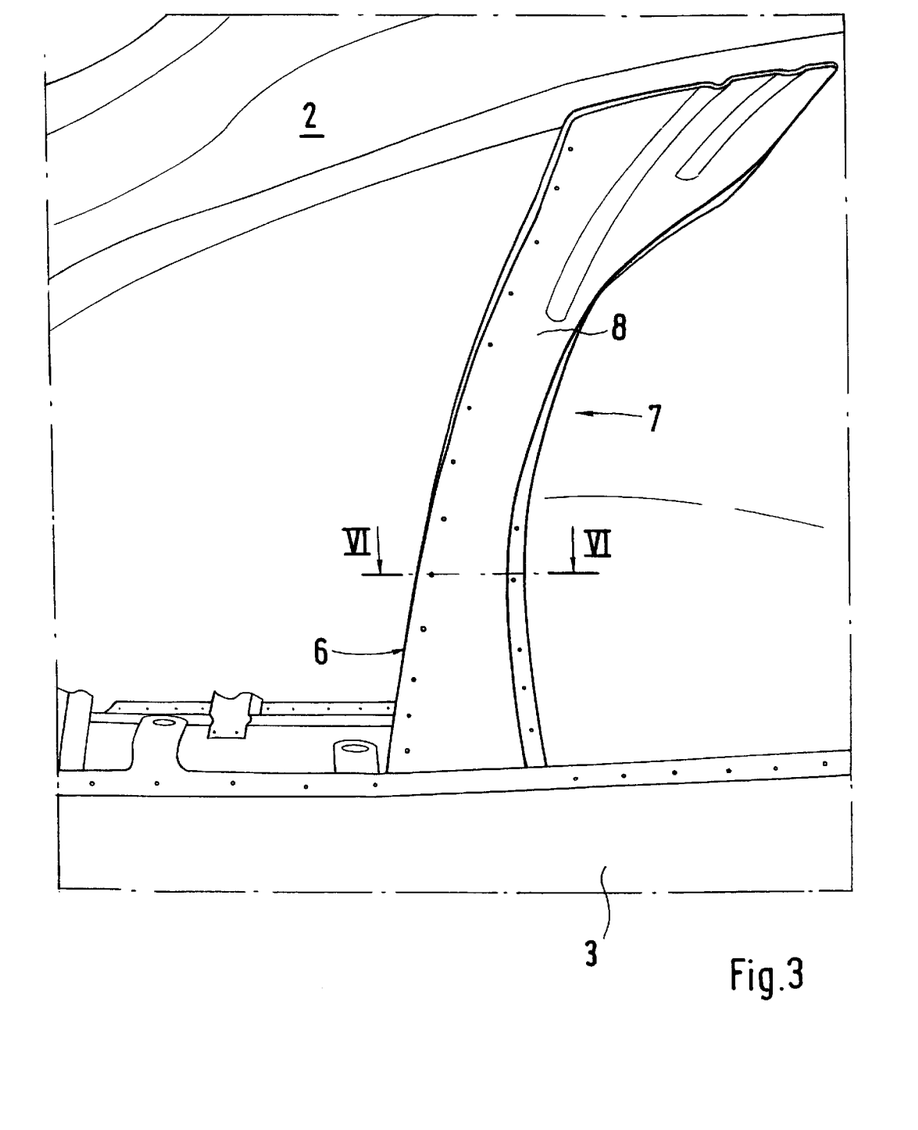
FIG. 3 is a lateral view of the vehicle with the reinforcing console.
Figure 4:
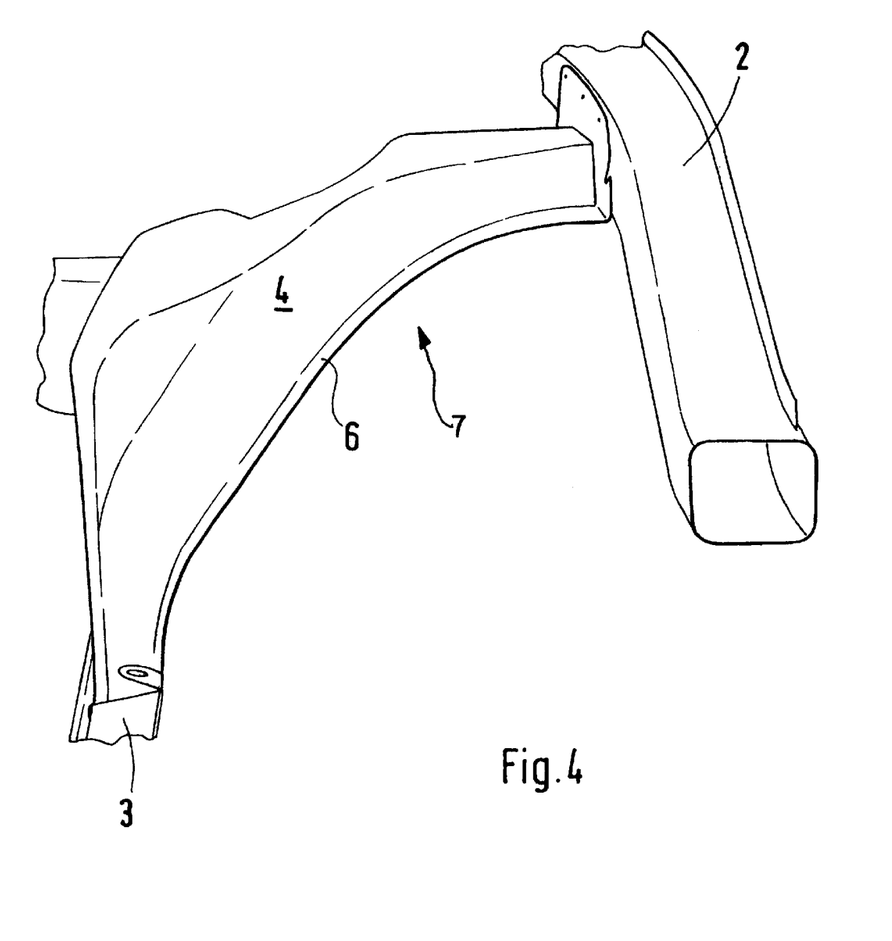
FIG. 4 is a frontal view of the sheet metal body part.
Figure 11:
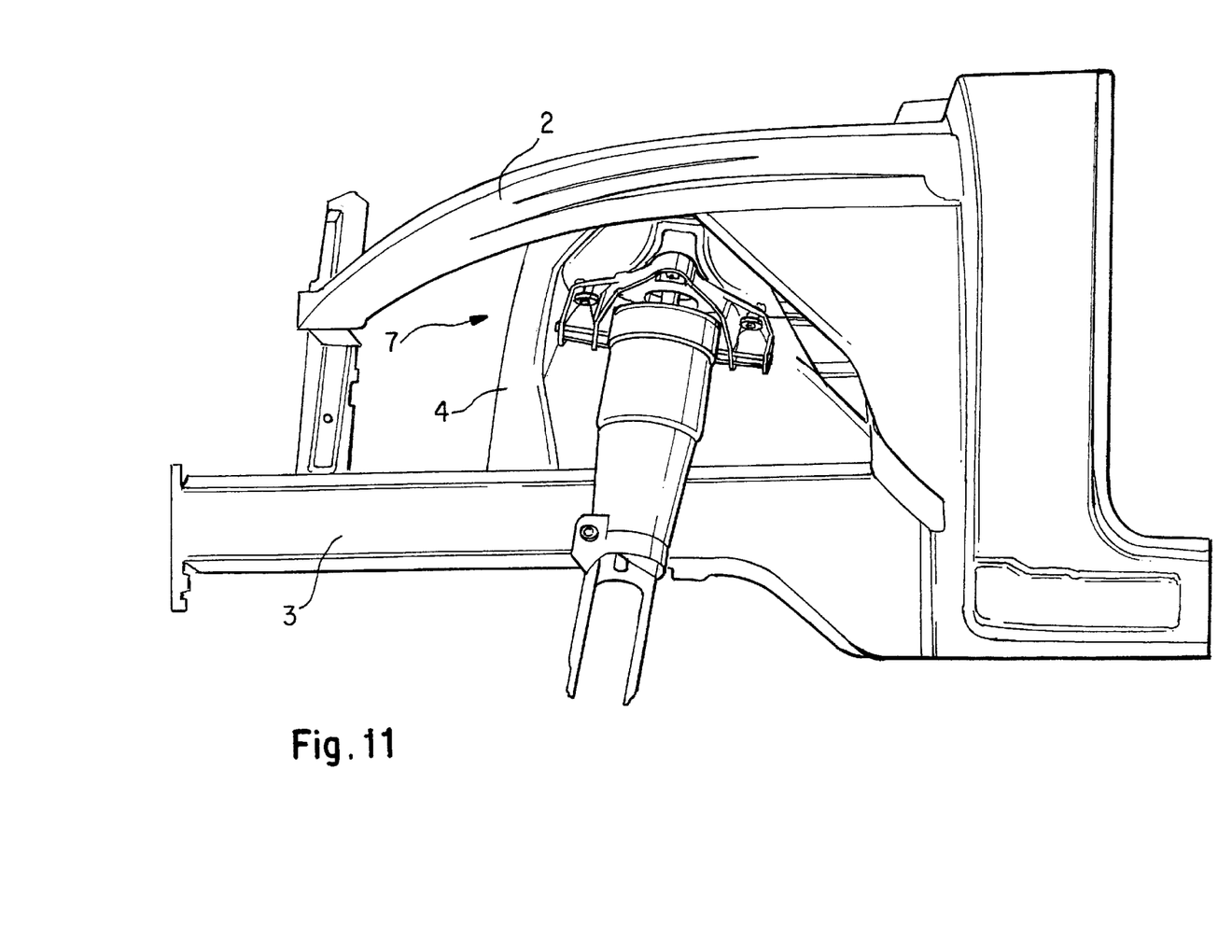
FIG. 11 shows an upper bearing of a spring strut.

FIG. 2 shows a cutout of a forward vehicle part 1 of a motor vehicle which comprises essentially an upper hood support 2, a lower side member 3 of a vehicle platform as well as a sheet metal body part 4 of a wheel house 16 with a reinforced supporting surface 5 for an upper bearing 17 of a spring strut. The upper bearing 17 is shown in FIGS. 10 and 11.

On the one hand, the sheet metal body part 4 is connected with a front wall 18 or an A-column of the vehicle and, by means of its forward edge 6—viewed in the driving direction F—is connected on all sides with a reinforcing console 7.

Figure 5:
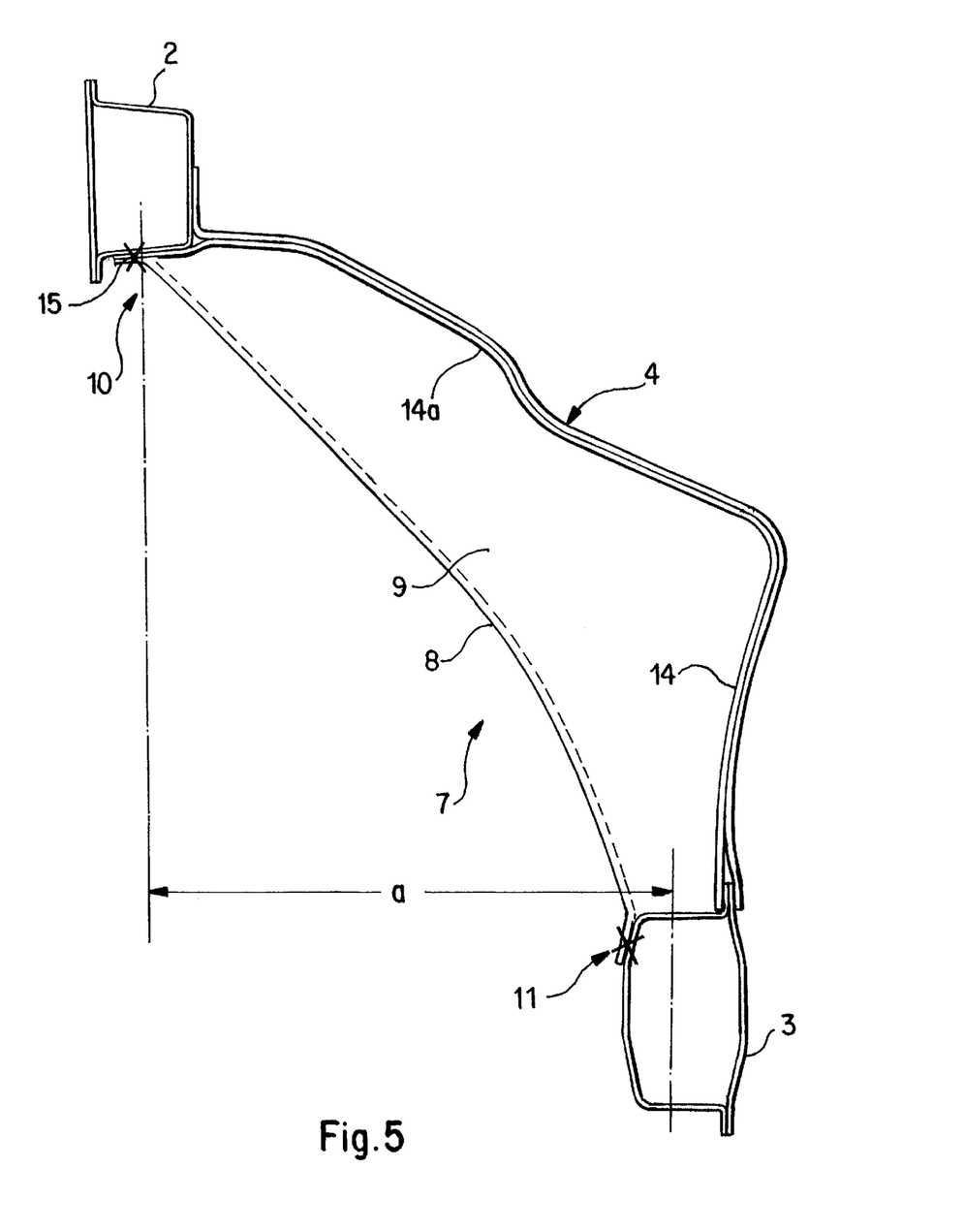
FIG. 5 is a view of the reinforcing console in the direction of the arrow Z of FIG. 2.

The reinforcing console 7 is arranged between the supports 2 and 3 and consists essentially of a triangularly shaped sheet metal part with a web 8 and a leg 9 bent thereto. This leg extends transversely to the vehicle, whereas the web 8 is aligned in the longitudinal direction of the vehicle; that is, the web surface is situated approximately parallel to the longitudinal center plane of the vehicle. On the whole, the console 7 is installed transversely in the vehicle between the supports 2 and 3. As illustrated in detail in FIG. 5, the upper end 10 of the console 7 extends to the lower end 11 of the console 7 by the extent "a" toward the inside with respect to the longitudinal center axis of the vehicle, so that an optimal wide support base is obtained in the transverse direction of the vehicle.

Figure 6:
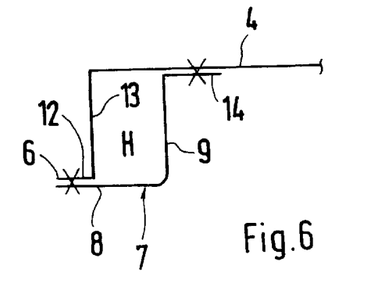
Figure 7:
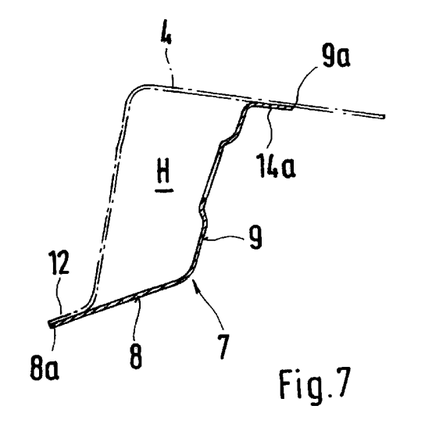
FIG. 7 is a sectional view, rotated 90° counter-clockwise, according to Line VII—VII of FIG. 2 of the reinforcing console and the sheet metal body part.
Figure 8:
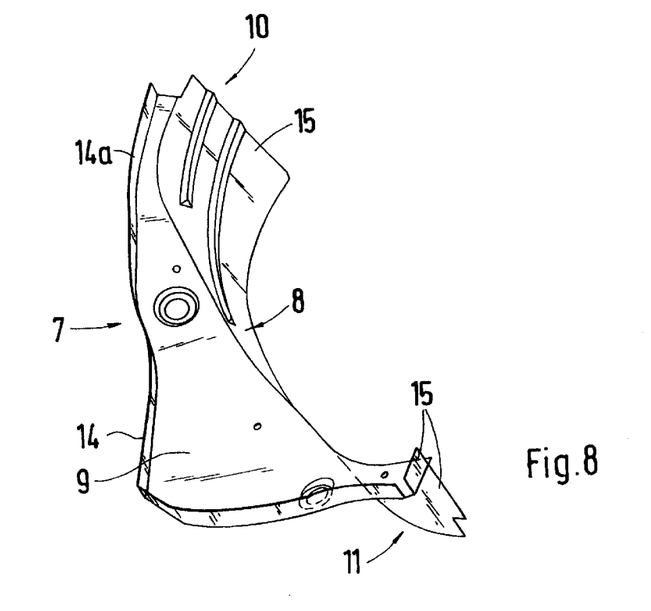
FIG. 8 is a diagrammatic representation of the reinforcing console.
Figure 9:
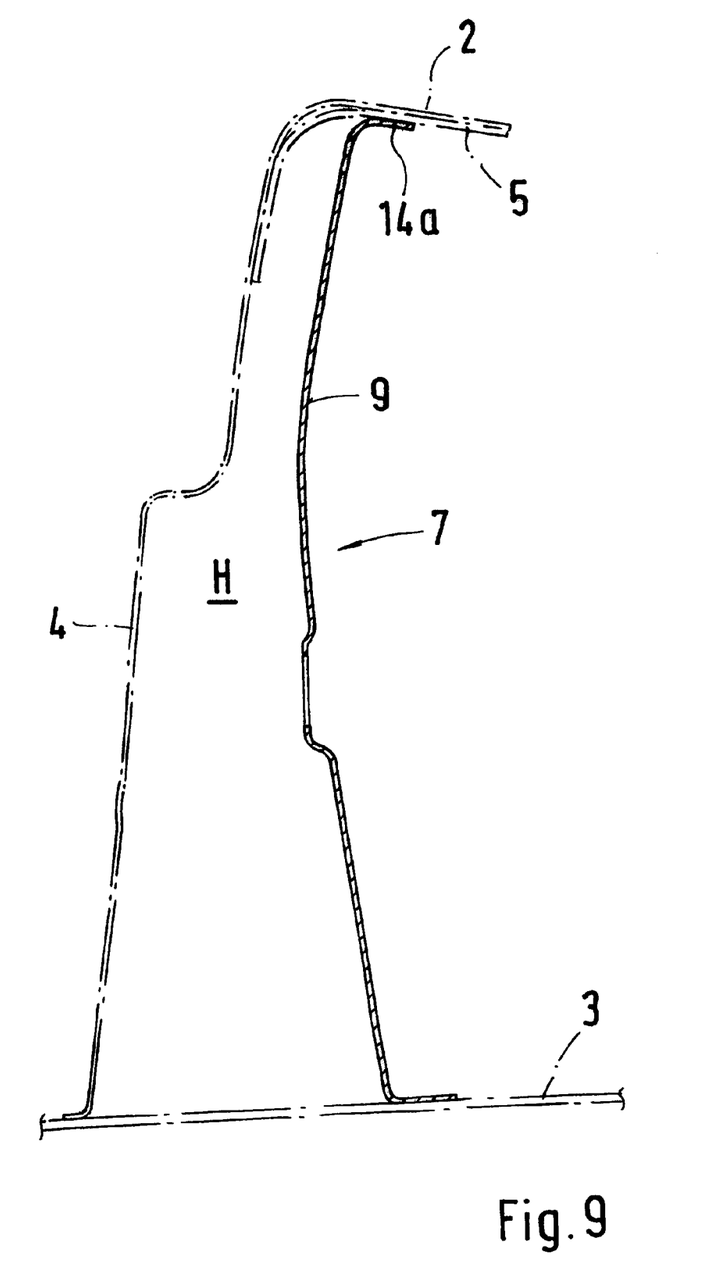
FIG. 9 is a vertical sectional view according to Line IX—IX of FIG. 2 of the reinforcing console and the sheet metal body part.

For the connection with the reinforcing console 7, the sheet metal body part 4 has a bent-out edge 12 (FIG. 6), which is adjoined by a bent leg 13 and, together with the leg 9 of the reinforcing console 7, results in a hollow support (H). The connection of the leg 9 of the reinforcing console 7 with the sheet metal body part 4 takes place by free bent-out edge sections 14, 14a. The web 8 of the reinforcing console 7 bent to the leg 9 is connected with a supporting surface 5 of the sheet metal body part 4 at a free edge 8a to form a hollow space. For fastening the reinforcing console by means of spot welding, the free edge sections 14, 14a of the leg and the free edge 8a of the web 8 of the reinforcing console 7 are connected for fastening purposes while resting on the surface of the sheet metal body part 4, as shown in FIGS. 6 and 7.

The connection of the ends 10 and 11 of the reinforcing console 7 with the supports 2 and 3 takes place on the upper and lower end 10, 11 by way of so-called lugs 15 or corresponding bent-out sections which can be connected with the surfaces of the supports 2 and 3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Body structure for a motor vehicle having a forward spring strut receiving device in a dome-shaped sheet metal body part of a wheel house, which forms an upper spring strut support, wherein on an open forward edge of the sheet metal body part of the spring strut receiving device in a driving direction between a lower side member support of a vehicle platform and a hood support vertically offset thereto, a reinforcing console is arranged which extends approximately vertically and in a transverse direction of the vehicle between the side member support and hood support and, together with the sheet metal body part, forms a closed hollow support profile of a polygonal cross-section;

wherein the reinforcing console has a U-profile-shaped construction and a web pointing in a longitudinal direction of the vehicle with a leg extending in the transverse direction of the vehicle; and wherein the reinforcing console has an approximately triangular construction and, in an installed position, is connected by a first approximately vertical edge section of the leg aligned transversely with respect to the vehicle on the sheet metal body part and by a second edge section adjoining at an angle, with a supporting surface of the sheet metal body part for supporting a spring strut, and the web bent with respect to the leg is connected with an edge bent with respect to the supporting surface of the sheet metal body part while forming a hollow space.

2. Body structure according to claim 1,
wherein free edge sections of the leg and a free edge of the web of the reinforcing console are connected with the sheet metal body part and a bent edge thereof, respectively, for fastening thereof.

3. Body structure according to claim 1,
wherein the reinforcing console has bent-out edge sections or lugs, which are each connectable with at least one of the side member and hood support.

4. Body structure according to claim 1,
wherein an upper spring strut bearing is arranged between a front wall of the vehicle and the reinforcing console, the reinforcing console being connected with the side member and hood support, wherein the side member and hood support are arranged in the transverse direction as well as in the vertical direction in a mutually offset manner.

5. Body structure for a motor vehicle having a forward spring strut receiving device in a dome-shaped sheet metal body part of a wheel house, which forms an upper spring strut support, wherein on an open forward edge of the sheet metal body part of the spring strut receiving device in a driving direction between a lower side member support of a vehicle platform and a hood support vertically offset thereto, a reinforcing console is arranged which extends approximately vertically and in a transverse direction of the vehicle between the side member support and hood support and, together with the sheet metal body part, forms a closed hollow support profile of a polygonal cross-section;

wherein the reinforcing console has an approximately triangular construction and a web which points in a longitudinal direction of the vehicle and has a bent leg which extends in the transverse direction of the vehicle; and wherein the reinforcing console has the triangular construction and, in an installed position, is connected by a first approximately vertical edge section of the leg aligned transversely with respect to the vehicle on the sheet metal body part and by a second edge section adjoining at an angle, with a supporting surface of the sheet metal body part for supporting the spring strut, and the web bent with respect to the leg is connected with an edge bent with respect to the supporting surface of the sheet metal body part while forming a hollow space.

6. Body structure according to claim 5, wherein free edge sections of the leg and a free edge of the web of the reinforcing console are connected with the sheet metal body part and a bent edge thereof, respectively, for fastening thereof.

7. Body structure for a motor vehicle having a forward spring strut receiving device in a dome-shaped sheet metal body part of a wheel house, which forms an upper spring strut support, wherein on an open forward edge of the sheet metal body part of the spring strut receiving device in a driving direction between a lower side member support of a vehicle platform and a hood support vertically offset thereto, a reinforcing console is arranged which extends approximately vertically and in a transverse direction of the vehicle between the side member support and hood support and, together with the sheet metal body part, forms a closed hollow support profile of a polygonal cross-section;

wherein the reinforcing console has a U-profile-shaped construction and a web pointing in a longitudinal direction of the vehicle with a leg extending in the transverse direction of the vehicle; and wherein free edge sections of the leg and a free edge of the web of the reinforcing console are connected with the sheet metal body part and a bent edge thereof, respectively, for fastening thereof.

8. Body structure according to claim 7, wherein the reinforcing console has bent-out edge sections or lugs, which are each connectable with at least one of the side member and hood support.

9. Body structure according to claim 7, wherein an upper spring strut bearing is arranged between a front wall of the vehicle and the reinforcing console, the reinforcing console being connected with the side member and hood support, wherein the side member and hood support are arranged in the transverse direction as well as in the vertical direction in a mutually offset manner.

10. Body structure for a motor vehicle having a forward spring strut receiving device in a dome-shaped sheet metal body part of a wheel house, which forms an upper spring strut support, wherein on an open forward edge of the sheet metal body part of the spring strut receiving device in a driving direction between a lower side member support of a vehicle platform and a hood support vertically offset thereto, a reinforcing console is arranged which extends approximately vertically and in a transverse direction of the vehicle between the side member support and hood support and, together with the sheet metal body part, forms a closed hollow support profile of a polygonal cross-section;

wherein the reinforcing console has an approximately triangular construction and a web which points in a longitudinal direction of the vehicle and has a bent leg which extends in the transverse direction of the vehicle; and wherein free edge sections of the leg and a free edge of the web of the reinforcing console are connected with the sheet metal body part and a bent edge thereof, respectively, for fastening thereof.

* * * * *